Patented Dec. 16, 1924.

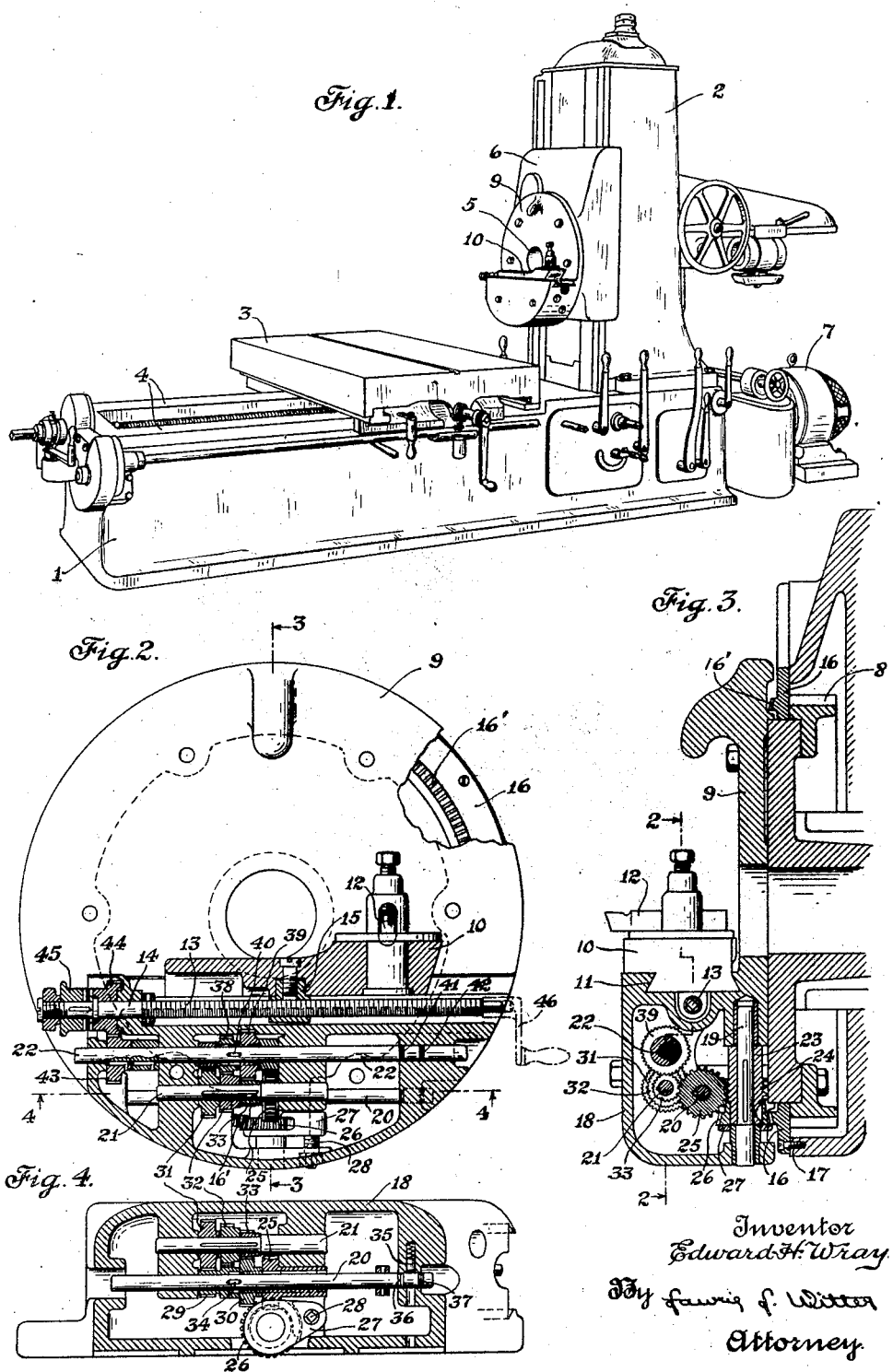

1,519,390

UNITED STATES PATENT OFFICE.

EDWARD H. WRAY, OF PHILADELPHIA, PENNSYLVANIA, ASSIGNOR TO NILES-BEMENT-POND COMPANY, OF NEW YORK, N. Y., A CORPORATION OF NEW JERSEY.

TOOL-FEEDING MECHANISM.

Application filed September 16, 1921. Serial No. 501,121.

*To all whom it may concern:*

Be it known that I, EDWARD H. WRAY, a citizen of the United States, residing at Philadelphia, in the county of Philadelphia and State of Pennsylvania, have invented certain new and useful Improvements in Tool-Feeding Mechanism, of which the following is a specification.

This invention relates to tool feeding mechanisms and particularly to a tool feeding mechanism for facing attachments for horizontal boring machines. The primary object of the invention is to provide an improved mechanism of the type stated preferably comprising a ring gear surrounding the tool spindle adjacent the tool holder for continuously feeding the tool radially of the spindle during the rotation thereof, the said spindle preferably being tubular in form to receive the boring bar therethrough.

Another object of the invention is to provide an improved tool feeding mechanism of the type stated and means in connection therewith for varying the feeding speed of the tool relative to the spindle rotation.

With the above and other objects in view, my invention consists in the features of construction and operation set forth in the following specification and illustrated in the accompanying drawing. In such drawing annexed hereto and forming a part of this specification, I have shown one embodiment of my invention as applied to a horizontal boring machine, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a perspective view of a horizontal boring machine embodying the invention.

Fig. 2 is a detail cross sectional view taken on line 2—2 of Fig. 3.

Fig. 3 is a detail longitudinal section thereof taken on the line 3—3 of Fig. 2.

Fig. 4 is a detail sectional view taken on the line 4—4 of Fig. 2.

Referring more specifically to the drawing by reference characters, 1 indicates the bed of a horizontal boring machine, 2 the tool supporting column thereon, and 3 the work table slidable on ways 4 of the bed. A tool spindle 5 is rotatably mounted in a saddle 6 vertically slidable in the column. A motor 7 may be provided for rotating the spindle through a spindle driving gear 8 and for operating the several elements of the machine in the usual manner.

A face plate 9 is mounted on the spindle and carries a tool holder 10 slidable in a guideway 11 formed in a support 18 projecting from the face plate at one side of the axis of the spindle 5. As illustrated, the tool supporting end of the tool holder is elevated sufficiently to bring the tool on a diametrical line parallel with the guideway whereby movement of the tool holder 10 along the guideway is adapted to move the tool 12 thereon radially of the spindle. A screw 13 journaled in the face plate at 14 engages a nut 15 on the tool holder whereby the latter is moved along its guideway. The screw 13 is adapted to be rotated from a ring gear 16 during the rotation of the spindle for feeding the tool. I have illustrated this ring gear as provided with bevel gear teeth 16' and as secured to the saddle 6. It will be understood, however, that within the broad scope of the invention, this gear may be provided with any desired form of gear teeth and may operate to feed the tool by providing for any desired form of relative rotation between the tool spindle and ring gear. In the drawing, the ring gear is illustrated as secured to the saddle 6 by means of bolts 17, and the following mechanism comprising change speed gearing within the support 18 on the face plate provides an operative connection from the ring gear to the screw 13 for feeding the tool holder as the spindle rotates.

As illustrated in Fig. 3, the mechanism comprising the driving connection from the ring gear 16 to the screw 13 includes one radial shaft 19 and three parallel shafts 20, 21 and 22. A sleeve 23, comprising a worm 24 in mesh with a worm gear 25 splined to shaft 20, is keyed to shaft 19. A bevel gear 26 is splined to the sleeve and is adapted to be moved longitudinally thereon into and out of mesh with the ring gear by means of a forked shifter element 27 operated by a screw 28.

As illustrated in Fig. 4, two gears 29 and 30 are loosely mounted on the shaft 20 adjacent the worm gear 25, gears 29 and 30 meshing respectively with gears 31 and 33 of gears 31, 32 and 33 keyed to shaft 21. A key 34 is provided in the shaft 20 between gears 29 and 30 and the shaft is longitudinally slidable to engage the key with either gear. A spring pressed detent 35 is adapted to enter either notch 36 or 37 in the shaft to hold the key engaged with either gear.

As illustrated in Fig. 2, gears 32 and 33 on the shaft 21 are in mesh with gears 38 and 39 loose on shaft 22. Shaft 22 is provided with a key 40 and is slidable to engage the key with either gear 38 or 39, a spring pressed detent also being provided for engaging within either notch 41 or 42 to hold the key in its driving engagement with either gear.

A gear 43 splined to shaft 22 is in mesh with a gear 44 loose on screw 13. A clutch element 45 is splined to the screw adjacent the gear 44 and is adapted to be shifted into engagement with such gear for driving the screw. By disengaging this clutch, the screw may be rotated by hand through a handle 46 thereon without rotating the several gears between the screw and ring gear.

In operation it will be noted that the worm 24 and worm wheel 25, in connection with the change speed gears, provides reduction gearing for feeding the tool at the proper reduced speed relative to the spindle rotation and by shifting the shafts 20 and 22 longitudinally, four different feeding speeds may be given to the tool. Should it be desired to rotate the spindle without feeding the tool, the screw 28 may be rotated to draw the bevel gear 26 from engagement with the ring gear whereupon shaft 19 and the feeding mechanism in connection therewith remain idle.

It should be understood that the horizontal boring machine shown in Fig. 1 of the drawing is adapted to perform boring operations (the boring bar not being illustrated), facing operations by the tool 12 illustrated, or a combination of such operations simultaneously. It will be noted by reference to the drawing that the spindle 5 is tubular in form whereby an axial bore is provided therein for receiving the boring bar. In order to leave the spindle bore clear for receiving the boring bar, the guideway 11 for the tool holder 10 is formed at one side of such bore on the face plate 9. One end of the tool holder is elevated sufficiently to bring the tool on a diametrical line parallel with the guideway whereby the tool will be fed radially of the spindle as the tool holder is moved along the guideway. It should furthermore be noted that the guideway is formed on a surface of the support 18 facing toward the axis of the spindle 5. The tool holder is thereby rigidly supported on a broad guiding surface directly beneath the tool, such surfaces directly receiving the thrust of the tool in operation.

What I claim is:

1. A tool feeding mechanism comprising the combination of a headstock, a rotary spindle therein, a face plate on the spindle, a tool holder adapted to support a tool thereon for feeding movement substantially radially of the face plate, a ring gear surrounding the spindle and bolted to the headstock adjacent the face plate, an operative connection between the ring gear and the tool holder for automatically and continuously feeding the tool holder as the spindle rotates, and means comprising change speed gearing in the said operative connection and on the face plate for varying the feeding speed of the tool holder relative to the spindle rotation.

2. A tool feeding mechanism comprising the combination of a rotary spindle, a tool holder mounted on the spindle for rotary movement therewith, a rotary screw for moving the tool holder in a direction to move the tool therein substantially radially of the spindle, a ring gear surrounding the spindle, the spindle being adapted to rotate relative to the ring gear, and an operative connection comprising a plurality of parallel shafts parallel with the screw and change speed gearing on the shafts between the ring gear and the screw for continuously rotating the screw to feed the tool holder as the spindle rotates and for varying the feeding speed thereof relative to the spindle rotation.

3. A tool feeding mechanism comprising the combination of a rotary spindle, a face plate thereon, a support projecting from the face of the face plate at one side of the spindle axis and having a guideway therein, a tool holder wholly supported for sliding movement in the guideway and adapted to support a tool thereon movable with the holder in a direction substantially radially of the spindle, a screw operatively connected to the tool holder, means for rotating the screw to automatically and continuously feed the tool holder along the guideway as the spindle rotates, and means whereby the feeding speed of the tool holder may be varied.

4. A tool feeding mechanism comprising the combination of a rotary spindle, a face plate thereon, a support projecting from the face of the face plate at one side of the spindle axis and having a guideway therein, a tool holder wholly supported for sliding movement in the guideway and adapted to support a tool thereon movable with the holder in a direction substantially radially of the spindle, a screw operatively connected to the tool holder, and means including change speed gearing within the said support for rotating the screw to automatically and continuously feed the tool holder at different speeds along the guideway as the spindle rotates, 5. A tool feeding mechanism comprising the combination of a rotary spindle, a face plate thereon, a support projecting from the face of the face plate at one side of the spindle and having a guideway thereon facing toward the spindle axis, a tool holder slidable in the guideway and adapted to support a tool therein movable with the holder in a direction substantially radially of the spindle, a screw operatively connected to the tool holder, and means for rotating the screw to automatically and continuously feed the tool holder along the guideway as the spindle rotates.

6. A tool feeding mechanism comprising the combination of a rotary spindle, a face plate on the spindle, the spindle and face plate having an axial bore therein for receiving a boring bar and the face plate being provided with a guideway, a tool holder slidable in the guideway and adapted to support a tool thereon movable with the holder in a direction substantially radial of the spindle, a screw operatively connected to the tool holder, and means for rotating the screw to automatically and continuously feed the tool holder along the guideway as the spindle rotates, the screw being so positioned on the face plate as to not interfere with the passage of a boring bar through the said spindle and face plate bore.

7. A tool feeding mechanism comprising the combination of a rotary spindle, a face plate on the spindle, the spindle and face plate having an axial bore therein for receiving a boring bar and the face plate being provided with a non-radial guideway, a tool holder slidable in the guideway at one side of the spindle axis and adapted to support a tool thereon movable with the holder in a direction substantially radially of the spindle, and means operatively connected to the tool holder for automatically and continuously feeding the tool holder along the guideway as the spindle rotates.

8. A tool feeding mechanism comprising the combination of a rotary spindle, a face plate on the spindle, the spindle and face plate having an axial bore therein for receiving a boring bar and the face plate being provided with a non-radial guideway, a tool holder slidable in the guideway and adapted to support a tool thereon movable with the holder in a direction substantially radially of the spindle, a screw operatively connected to the tool holder, and means including change speed mechanism for rotating the screw to automatically and continuously feed the tool holder at different speeds along the guideway as the spindle rotates.

9. A tool feeding mechanism comprising the combination of a rotary spindle, a face plate on the spindle, the spindle and face plate having an axial bore therein for receiving a boring bar, a support projecting from the face of the face plate at one side of the spindle and having a guideway therein, a tool holder slidable in the guideway and adapted to support a tool thereon movable with the holder in a direction substantially radially of the spindle, a screw operatively connected to the tool holder, and means including change speed gearing within the said support for rotating the screw to automatically and continuously feed the tool holder at different speeds along the guideway as the spindle rotates.

In testimony whereof, I hereto affix my signature.

EDWARD H. WRAY.